US008967566B2

(12) United States Patent
McClain et al.

(10) Patent No.: US 8,967,566 B2
(45) Date of Patent: Mar. 3, 2015

(54) SEATBACK-MOUNTABLE CLAMP ASSEMBLY

(71) Applicants: Bryan Ulrich McClain, Foster City, CA (US); Demetrius Madrigal, San Jose, CA (US); Anthony Printis, Redwood City, CA (US)

(72) Inventors: Bryan Ulrich McClain, Foster City, CA (US); Demetrius Madrigal, San Jose, CA (US); Anthony Printis, Redwood City, CA (US)

( * ) Notice: Subject to any disclaimer, the term of this patent is extended or adjusted under 35 U.S.C. 154(b) by 0 days.

(21) Appl. No.: 13/732,556

(22) Filed: Jan. 2, 2013

(65) Prior Publication Data

US 2014/0183313 A1   Jul. 3, 2014

Related U.S. Application Data

(60) Provisional application No. 61/583,491, filed on Jan. 5, 2012.

(51) Int. Cl.
| | |
|---|---|
| A47B 96/06 | (2006.01) |
| E04G 3/00 | (2006.01) |
| F16B 1/00 | (2006.01) |
| G09F 7/18 | (2006.01) |
| F16M 11/04 | (2006.01) |
| F16M 11/14 | (2006.01) |
| F16M 13/02 | (2006.01) |

(52) U.S. Cl.
CPC ............. F16M 11/041 (2013.01); F16M 11/14 (2013.01); F16M 13/022 (2013.01)
USPC .............. 248/229.12; 248/229.22; 248/316.1; 248/316.4; 269/43; 269/71

(58) Field of Classification Search
USPC ........ 248/315, 316.1, 316.4, 316.6, 693, 690, 248/274.1, 306, 307, 305, 288.51, 689, 248/228.7, 230.7, 231.81, 316.7, 229.26, 248/229.16, 154, 176.1, 177.1, 181.1, 248/221.11, 222.11, 222.12, 224.7, 229.14, 248/229.17, 229.2, 229.24, 229.22, 229.12; 379/454, 455, 426

See application file for complete search history.

(56) References Cited

U.S. PATENT DOCUMENTS

| | | | | | |
|---|---|---|---|---|---|
| 711,056 | A | * | 10/1902 | Je Larkin | ....................... 248/491 |
| 2,488,243 | A | * | 11/1949 | Schneir | ......................... 248/491 |

(Continued)

OTHER PUBLICATIONS

Fenten, Randy, file titled "130422_Zhip_Internet_pages.pdf" with pages from Internet web site at address http://www.zhip.com, original publication date unknown but Internet page marked with copyright year 2010.

*Primary Examiner* — Nkeisha Smith
(74) *Attorney, Agent, or Firm* — Phillip M. Wagner

(57) ABSTRACT

A clamping apparatus removably attachable to an elongate support such as a tray table latch on a seatback with a stowable tray table includes a pair of opposing hand grips slidably coupled to a clamp frame. Each hand grip includes a clamp jaw protruding from a back side of the clamp frame. A spring urges the hand grips apart and the clamp jaws toward one another. A flexible band attached to both hand grips is provided for suspending the clamp frame. When a person releases the opposing hand grips, the flexible band partially retracts into the clamp frame, drawing the frame against the latch, and the two clamp jaws grip opposite sides of the latch. Compressing the hand grips laterally toward one another extends the flexible band out of the clamp frame and displaces the two clamp jaws away from one another.

14 Claims, 19 Drawing Sheets

(56) References Cited

U.S. PATENT DOCUMENTS

| | | | | |
|---|---|---|---|---|
| 2,497,194 A * | 2/1950 | White | | 248/500 |
| 2,515,793 A * | 7/1950 | Owens | | 248/126 |
| 2,598,610 A * | 5/1952 | Satz et al. | | 49/463 |
| 2,737,361 A * | 3/1956 | Petzke | | 248/491 |
| 2,826,384 A * | 3/1958 | Brown | | 248/491 |
| 2,899,154 A * | 8/1959 | Zavolner | | 248/491 |
| 4,542,875 A * | 9/1985 | DeBaun et al. | | 248/491 |
| 5,573,214 A * | 11/1996 | Jones et al. | | 248/311.2 |
| 5,839,710 A * | 11/1998 | Hubbard | | 248/311.2 |
| 5,941,434 A * | 8/1999 | Green | | 224/250 |
| 6,007,041 A * | 12/1999 | Law | | 248/491 |
| 2005/0045681 A1 * | 3/2005 | Hancock et al. | | 224/401 |
| 2008/0070641 A1 | 3/2008 | Wang | | |
| 2008/0296334 A1 | 12/2008 | Carnevali | | |
| 2009/0060473 A1 | 3/2009 | Kohte et al. | | |
| 2009/0270727 A1 * | 10/2009 | Zhao et al. | | 600/437 |
| 2010/0123064 A1 * | 5/2010 | Ziaylek et al. | | 248/274.1 |
| 2010/0288900 A1 | 11/2010 | Janik | | |
| 2013/0034334 A1 * | 2/2013 | Fariello et al. | | 385/135 |

* cited by examiner

SECTION A-A

SEATBACK-MOUNTABLE CLAMP ASSEMBLY

CROSS REFERENCE TO RELATED APPLICATIONS

This application claims the benefit of U.S. Provisional Application No. 61/583,491, filed Jan. 5, 2012, incorporated herein by reference in its entirety.

FIELD OF THE INVENTION

The present invention relates generally to a clamping apparatus and more specifically to a clamping device for holding a portable electronic device against a seat having a stowable seatback tray table.

BACKGROUND

Communications, information services, entertainment, and other applications and functions that were once provided by separate electronic devices are now commonly provided by "smart" phones and other advanced portable electronic devices such as electronic tablets, portable gaming systems and electronic book readers having bright, colorful, high-resolution displays. As a result, people are spending more and more time interacting with portable electronic devices for viewing maps, watching movies, conducting Internet searches, receiving news, sending and receiving email and text messages, playing games, and other visually intensive and time consuming activities. The small size of such devices makes them easy to carry and easy to use in confined conditions. However, because of the small size of the displays used in many portable electronic devices, the best viewing may occur when a portable electronic device is held steady, without shaking, swaying, or other distracting motions.

A person may find it tiresome to hold a portable electronic device steady at a preferred viewing angle and viewing distance for an extended period of time. It can be difficult to perform other tasks while one's hands are occupied with holding a portable electronic device. Many different kinds of mounting devices such as stands, holders, clamps, and rests have been proposed for freeing one's hands and steadying a small display for easier viewing. Some mounting devices are adequate for resting a portable electronic device on a stationary table, desk, or other flat surface, but may tip over or fall off a support surface in a moving vehicle. Other mounting devices depend on suction cups or magnets for attaching the mounting device to a support structure, but suction cups are ineffective on porous or textured surfaces and magnetic attachments are ineffective on nonferrous support structures. Yet other mounting devices use hooks or clips to attach to a support structure such as a seat back, a table edge, and other locations with an edge or projection suitable for attaching a hook or clip. However, a hook or clip having a size and shape suited for attachment to one type of support structure may be unable to attach to other types of support structures.

A mounting device may include a retractable tether wrapped around a spring-loaded reel. The tether unwinds from the reel as the tether is withdrawn from the mounting device and is rewound on the reel when tension on the tether is reduced. The tether may be provided with a hook or clip at the free end. The hook or clip may be attached to an external structure to suspend the mounting device. Or, the tether may be wrapped around an external structure and the hook or clip attached to an anchor point on the mounting device to suspend the mounting device from a loop formed in the tether.

Mounting devices with retractable tethers may perform poorly for several reasons. The tether may bind and fail to retract properly. The tether may unwind from the reel when a portable electronic device heavy enough to overcome the spring in the tether reel is attached to the mounting device. If the hook at the end of the tether slips from its anchor point, the hook and tether may lash out unexpectedly during retraction and strike a nearby object or person. If a tether reel spring is strong enough to retract its tether until the mounting device is held tightly against a support structure, the tether hook or clip may be difficult to disengage from its anchor. A mounting device attached to an external structure by a tether alone may rock or sway during use of the portable electronic device or as a result of vehicle motion, even when the tether is pulled tight by spring tension in the tether reel.

Some mounting devices don't provide firm enough support for an electronic device and may unexpectedly release the electronic device, or the mounting device itself may separate from a support structure when subjected to vibration, acceleration, normal operation of a keypad or touch screen, or accidentally bumping the mounting device or portable electronic device, as may occur in a moving vehicle. Some mounting devices are bulky and difficult to carry or store when not in use. Other mounting devices project a substantial distance from the surface of the structure to which they are attached and may interfere with the movements of other people in the vicinity, for example by impeding aisle access for a person seated near a mounting device attached to a seatback on a train, bus, or airplane.

SUMMARY

A clamp frame includes a first hand grip slidably coupled to the clamp frame and a second hand grip slidably coupled to the clamp frame. The first hand grip includes a first clamp jaw. The second hand grip includes a second clamp jaw. A flexible band has a first end attached to the first hand grip and a second end attached to the second hand grip. A spring is connected to the first hand grip and second hand grip. The spring is disposed between the first and second hand grips so as to urge the two hand grips apart from one another, remove slack from the flexible band, and urge the first and second clamp jaws toward one another. A displacement of the first and second hand grips toward one another forces the flexible band to extend outward from the clamp frame and displaces the first and second clamp jaws laterally away from one another. Displacement of the first and second hand grips away from one another by the spring partially retracts the flexible band into the clamp frame.

DESCRIPTION

Figure 1:
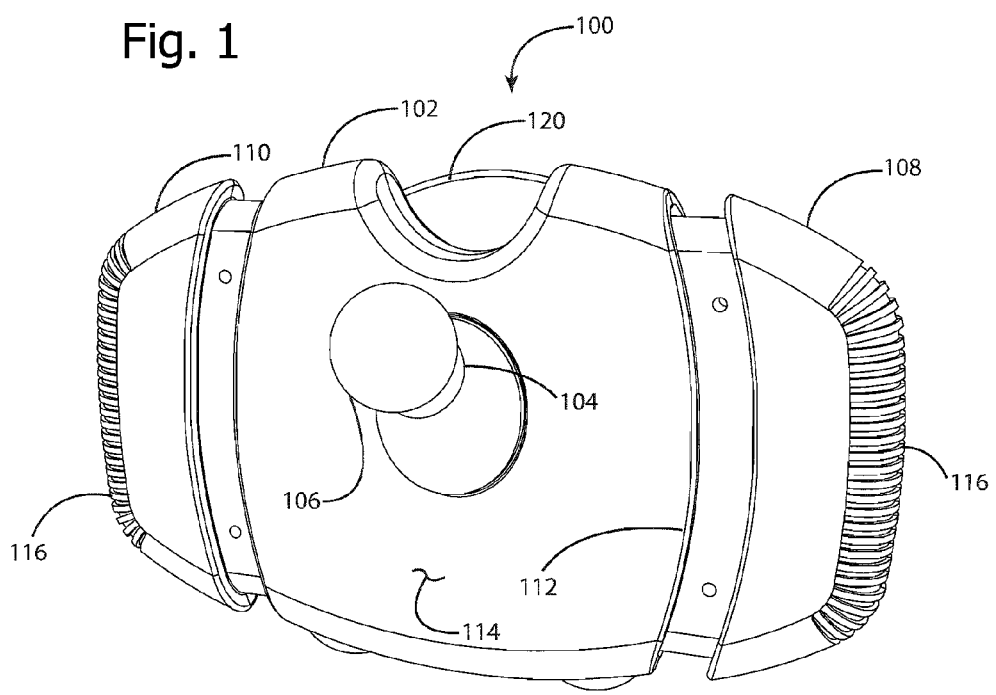
FIG. 1 is a pictorial view toward the front side of an example of a clamp assembly in accord with an embodiment of the invention.

Embodiments of the invention comprise a clamp assembly for securely attaching a portable electronic device to an external elongate support structure such as a tray latch on the seatback of a passenger seat. Examples of passenger seats having seatback trays and tray latches suitable for use with embodiments of the invention may be found on passenger aircraft, trains, ferry boats, and tour buses. A clamp assembly embodiment of the invention enables one or more persons to comfortably view and operate a portable electronic device by firmly and removably clamping the portable electronic device to a seatback in front of them. The clamp assembly includes two opposing hand grips slidably connected to a clamp frame. The two hand grips operate two separate clamps for quickly and securely attaching the clamp assembly to a tray latch and for easily disengaging the clamp assembly from the tray latch. A first clamp comprises a flexible band for suspending the clamp assembly from a tray latch and for drawing the clamp assembly into firm contact with the tray latch. The flexible band carries most of the combined weight of the clamp assembly and an attached portable electronic device when the clamp assembly is attached to a tray latch. A second clamp comprises a pair of opposed clamp jaws for firmly gripping opposite sides of the tray latch to prevent swaying or other lateral shifts in position of the clamp assembly relative to the tray latch. Squeezing the hand grips toward one another enables the first and second clamps to slide over a tray latch for suspending the clamp assembly from the latch or to remove the clamp assembly from the latch. Releasing the hand grips causes the first and second clamps to firmly grip the tray latch. The combination of two clamps for attaching a clamp assembly to an external support provides more stability for operating and viewing a portable electronic device than a clamping apparatus having only one clamp.

Embodiments of a clamp assembly are adapted to carry a device adapter which may be connected to a pivot arm attached to the front side of the clamp frame. A device adapter securely supports and holds a selected portable electronic device while the device adapter is connected to a clamp assembly. The device adapter may be rotatable relative to the clamp assembly to adjust a viewing angle for the portable electronic device. A clamp assembly in accord with an embodiment of the invention may optionally include a device adapter. Device adapters are described in U.S. Nonprovisional patent application Ser. No. 13/072,685 titled "Seatback-Mountable Holder for a Portable Electronic Device", filed Mar. 26, 2011, by Bryan Ulrich McClain, Demetrius Madrigal, and Anthony Printis, incorporated herein by reference in its entirety.

A clamp assembly in accord with an embodiment of the invention frees a person's hands from holding a portable electronic device while the person views or operates the portable electronic device. The clamp assembly securely attaches to a tray latch whether the seatback to which the clamp assembly is attached is fully upright, i.e., not reclined, partially reclined, or reclined to its limit, i.e., fully reclined. By employing two different adjustable clamps, clamp assembly embodiments of the invention are well suited for secure attachment to tray latches and other elongate supports of many different shapes and dimensions. The clamp assembly includes two large hand grips which, when compressed toward one another, release the two adjustable clamps from an external elongate support such as a tray latch. When the two hand grips are released, both clamps firmly engage the tray latch. Embodiments of the invention may therefore be operated easily by persons having poor finger dexterity or grip strength, for example young children or persons with arthritis or other limitations in hand motions. Clamp assembly embodiments of the invention hold securely to a tray latch even when the vehicle or vessel carrying the clamp assembly is undergoing strong shaking or vibration, yet releases easily and quickly from a seatback when a user of the clamp assembly wishes to disengage it from the seatback. Furthermore, a stable and secure connection is maintained between the clamp assembly and a tray latch without causing damage to the tray latch, tray table, or seatback.

Examples of portable electronic devices suitable for use with an embodiment of the invention include, but are not limited to, cellular telephones, cameras, audio recording devices, audio playback devices such as MP3 players, video playback devices, electronic devices for playing games, and devices combining two or more of these functions.

A rotatable tray table latch on a passenger seat with a stowable seatback tray table is an example of an elongate support to which an embodiment of the invention may be attached. Other examples of elongate supports which may be used with an embodiment of the invention include, but are not limited to, a cabinet handle, a door handle, a control lever on an instrument panel or appliance, and other structures which may be placed in an approximately vertical orientation and which have some part around which a flexible strap or band may be placed. A vertical orientation as referenced herein applies to a structure arranged with its longest dimension in a vertical plane, where a vertical plane is one that is approximately perpendicular to a surface upon which a person may stand or sit. With reference to an embodiment of the invention, a vertical direction is a direction from a bottom side of the clamp assembly toward a top side, or vice versa, when the clamp assembly is positioned as if attached to a latch or other elongate support for viewing a display on a portable electronic device. A lateral direction refers to a direction from a left side of a clamp assembly toward a right side, or vice versa. A reference to a front side or front surface refers to a side or surface facing the viewing direction of a person using the clamp assembly when the clamp assembly is attached to a seatback.

Referring now to FIG. 1, an example of a seatback-mountable embodiment of the invention 100 comprises a clamp frame 102 for attaching the clamp assembly 100 to an elongate support and an adapter pivot arm 104 having a ball joint 106 for rotatably coupling to a device adapter (not shown). The adapter pivot arm 104 is attached to an exterior front surface 114 of the front cover 112 for the clamp frame 102. In alternative embodiments of a clamp assembly 100, the adapter pivot arm 104 and ball joint 106 may be replaced with at least one pivot arm coupled by a hinge on the front cover 112 of the clamp frame 102 and optionally coupled by another hinge to a device adapter. The ball joint 106 enables an electronic device held by a device adapter connected to the ball joint to be rotated to a comfortable viewing angle.

The clamp assembly 100 includes a right hand grip 108 on a right side of the clamp assembly and a left hand grip 110 on a left side of the clamp assembly. The right and left hand grips are slidably coupled to the clamp frame 102 and simultaneously adjust two clamps to engage or disengage with a tray latch. Each hand grip may optionally be provided with a nonslip grip 116. Each nonslip grip 116 may optionally be formed as an integral part of a hand grip or may alternatively be formed as a separate part that is attached to a hand grip.

Figure 2:
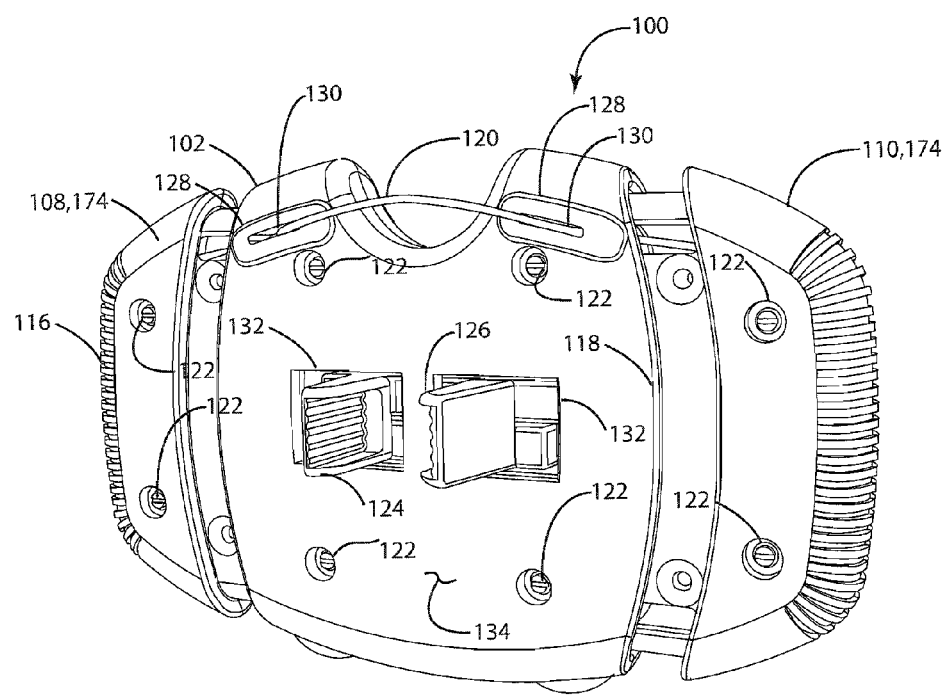
FIG. 2 is a pictorial view toward the back side of the clamp assembly of FIG. 1.

A segment of a flexible band 120 is visible in FIG. 1 through an arcuate aperture formed along the top of the clamp assembly 100. The flexible band 120 corresponds to a first of the two clamps on a clamp frame and is selected to be strong enough to support the clamp assembly 100, a device holder, and an electronic device through many cycles of engagement and disengagement with tray latches under conditions of shaking and vibration which would be expected to occur aboard a passenger aircraft, bus, or train. More of the segment of the flexible band 120 outside the clamp frame 102 is visible in the view toward the exterior surface 134 of the back cover 118 shown in FIG. 2. The flexible band 120 passes through a slot 130 formed in an elongate boss 128, through a channel formed in each of the left hand grip 110 and right hand grip 108, and is attached to an anchor post inside each hand grip. In FIG. 2, one elongate boss 128 is visible near an upper left side of the back cover 118 and another elongate boss 128 is visible near an upper right side of the back cover 118.

The flexible band 120 is free to slide through the slots 130 when the hand grips (108, 110) are displaced toward one another or away from one another. When the left hand grip 110 and the right hand grip are pressed toward one another, the flexible band 120 extends outward, away from the exterior rear surface 134 of the back cover 118. The portion of the flexible band 120 extending out from the clamp frame 102 may be placed around a tray latch to suspend the clamp assembly 100 from the latch. The extended flexible band 120 may alternatively be suspended from a hook or slot formed in a tray latch. When the left and right hand grips are released, part of the flexible band 120 is retracted into the interior of the clamp frame 102, and when the flexible band is placed around a tray latch or in a slot in the tray latch, retracting the flexible band 120 causes the clamp assembly 100 to be drawn into firm contact with the tray latch or other elongate support to which the clamp assembly 100 is being attached.

FIG. 2 illustrates the flexible band 120 and further illustrates an example of a second clamp comprising a pair of clamp jaws extending outward from the exterior surface 134 of the back cover 118 through apertures 132 formed in the back cover. A first clamp jaw 124 is attached to the left hand grip 110. A second clamp jaw 126 is attached to the right hand grip 108. Compressing the right hand grip toward the left hand grip forces the first and second clamp jaws apart, thereby enabling the clamp assembly 100 to slide freely over a tray latch. Releasing the right and left hand grips (108, 110) causes the clamp jaws to move toward one another to grip the sides of a tray latch or other elongate support.

The back cover 118 is joined to the front cover 112 by a plurality of fasteners 122. When joined together, the back cover 118 and front cover 112 enclose a space within the clamp frame 102 for holding parts of the left and right hand grips and parts of the first and second clamps. The left hand grip 110 and right hand grip 108 may each optionally include a detachable hand grip cap 174 to provide access to an anchor point for installation or replacement of the flexible band 120. Hand grip caps 174 may be attached to hand grips by fasteners 122.

Figure 3:
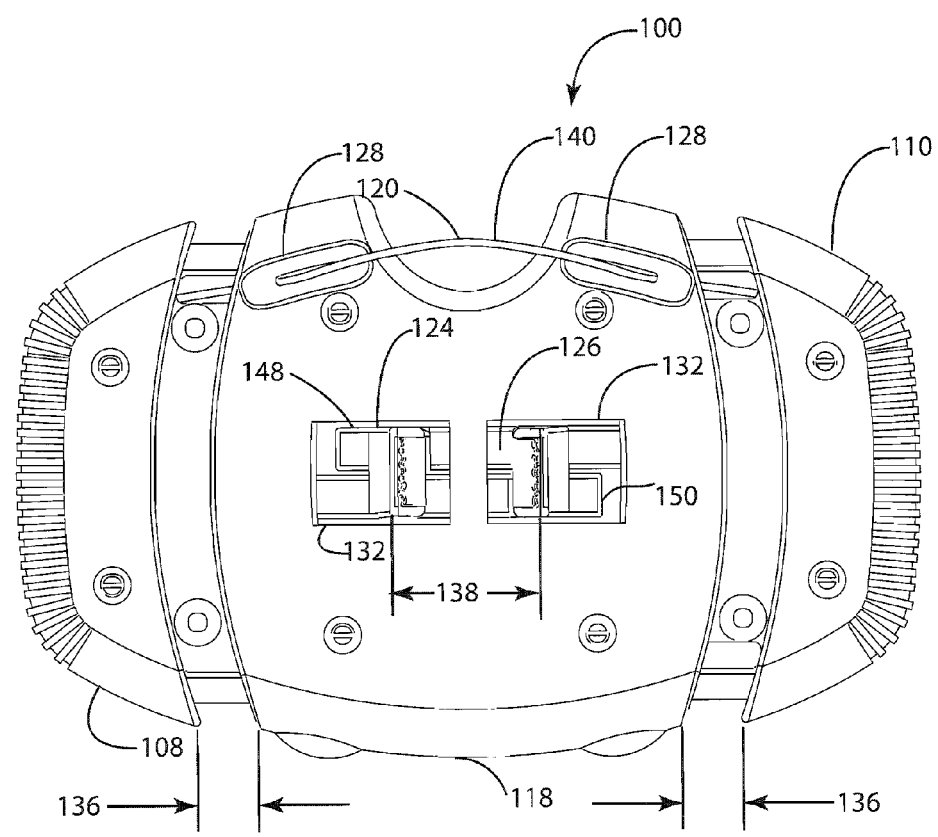
FIG. 3 shows the exterior of the back cover on the back side of the clamp assembly of FIGS. 1-2, with the right and left hand grips in their uncompressed positions fully extended outward from the sides of the clamp assembly, two clamp jaws protruding through apertures in the back cover, and a segment of the flexible band visible outside the clamp assembly.
Figure 4:
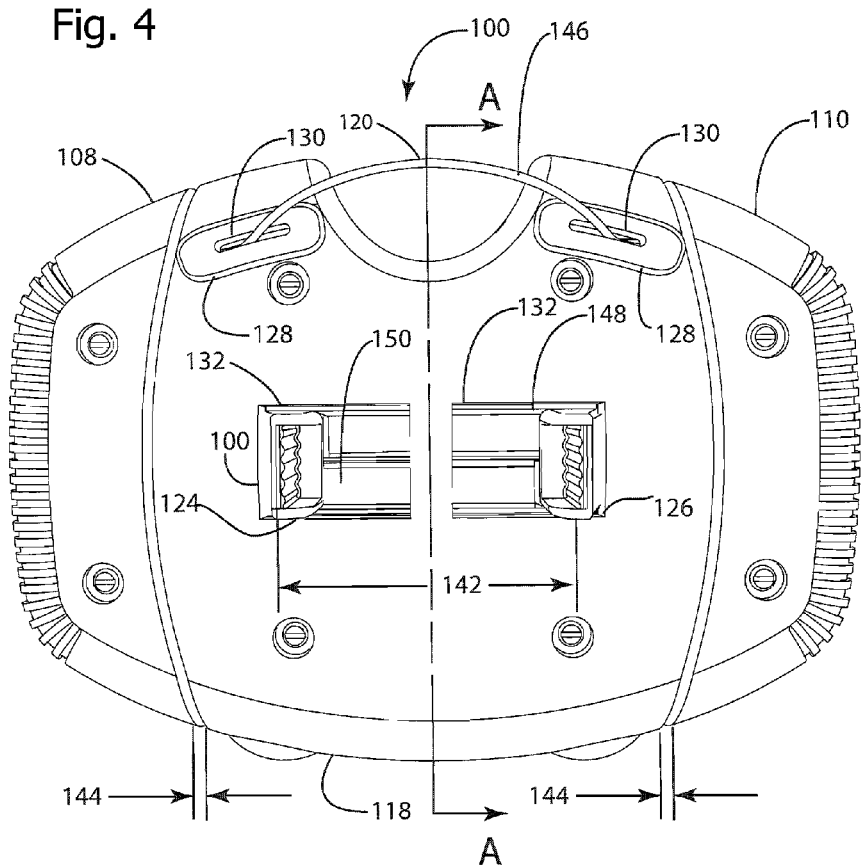
FIG. 4 shows the back of the clamp assembly as in FIG. 3, but with the right and left hand grips in their fully compressed positions, the clamp jaws displaced by a maximum separation distance so as to be easily disengaged from a tray latch, and the flexible band shown in a slack condition with an exposed length outside the clamp assembly that is greater than the exposed length in FIG. 3.
Figure 5:
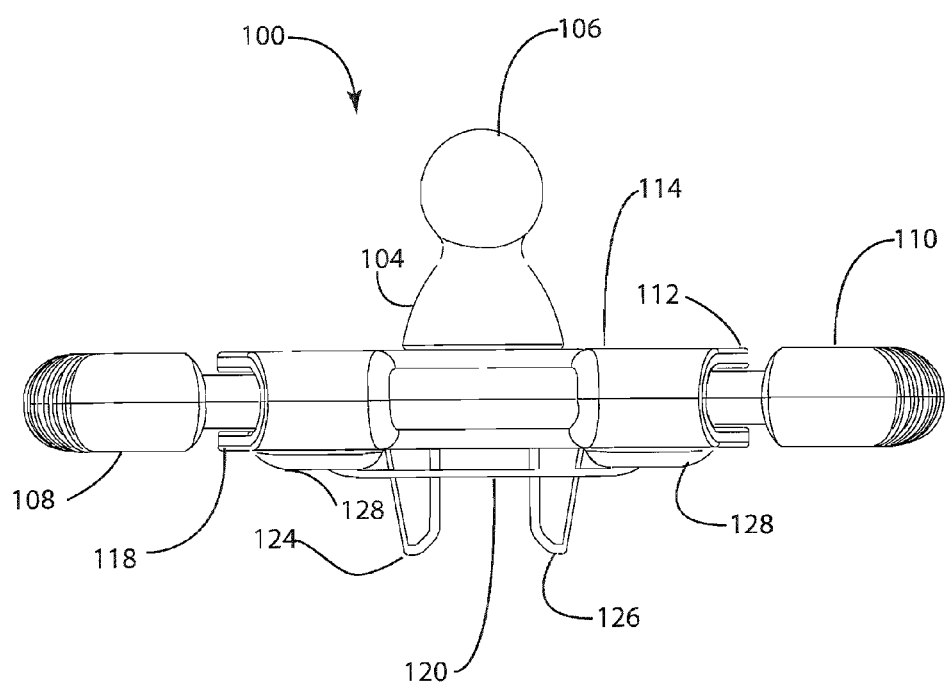
FIG. 5 shows the top of the clamp assembly of FIGS. 1-4 with the left and right hand grips extended as in the example of FIG. 3 and the flexible band in its fully retracted position.

FIGS. 3-6 illustrate examples of the compressed and uncompressed positions of the left and right hand grips. The uncompressed positions of the hand grips may also be referred to as the fully extended positions of the hand grips. FIGS. 3-4 show a view toward the back cover 118 of the clamp assembly 100 example from the previous figures. In the example of FIG. 3, the first clamp jaw 124 is attached to a support beam 148. The support beam 148 is further attached to the left hand grip 110. The second clamp jaw 126 is attached to another support beam 150 that is attached to the right hand grip 108. Each clamp jaw is displaced laterally (left to right or vice versa) by displacement of its corresponding support beam and hand grip, and each clamp jaw is supported by its own support beam and by sliding contact with its neighboring support beam. In the example of FIG. 3, the left hand grip 110 and the right hand grip 108 are shown in their fully extended or uncompressed positions as indicated by a maximum separation distance 136 between an edge of each hand grip and an adjacent edge of the back cover 118. The first clamp jaw 124 and second clamp jaw 126 are shown with a minimum separation distance 138 between opposing faces of the clamp jaws. FIG. 3 further illustrates the flexible band 120 in its fully retracted position 140. With both clamps engaged with a tray latch, the flexible band 120 and opposing clamp jaws (124, 126) securely suspend the clamp assembly 100 from the latch and preventing the clamp assembly from swaying or rocking relative to the latch. The adjustability of the flexible band 120 and clamp jaws (124, 126) allow the clamp assembly 100 to securely engage with and easily disengage from elongate supports of many different shapes and sizes. The view toward the top of a clamp assembly 100 in FIG. 5 represents the flexible band 120 in its fully retracted position. FIG. 5 shows the left and right hand grips in their uncompressed positions.

Figure 6:
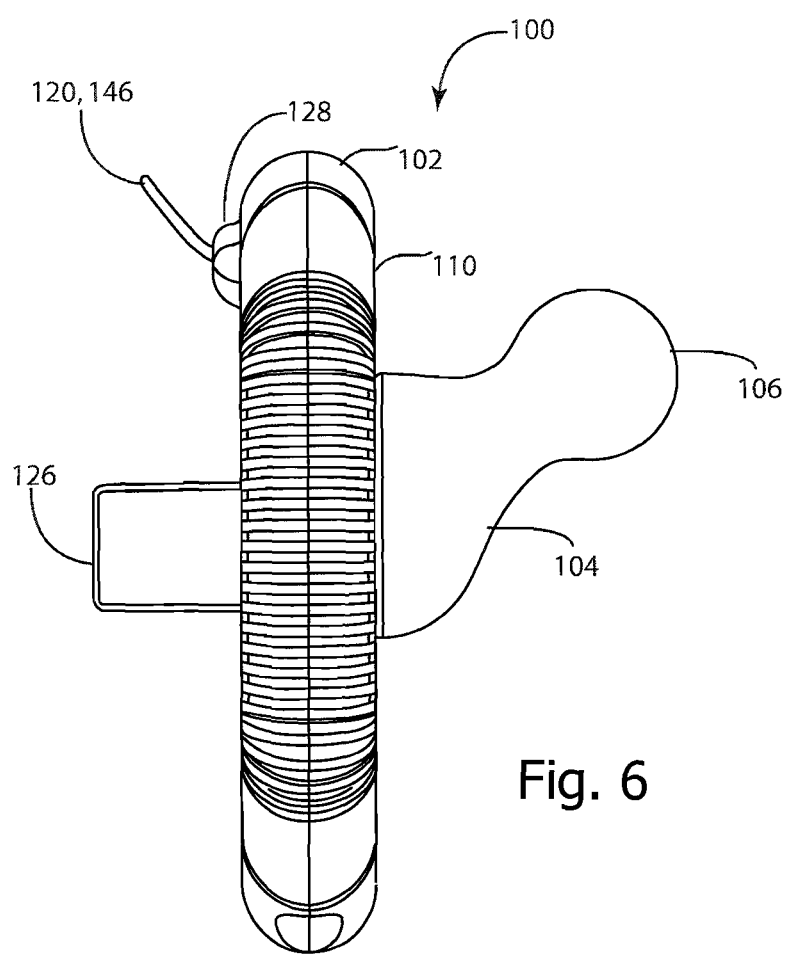
FIG. 6 shows a view toward the left side of the clamp assembly of FIGS. 1-5, in which the flexible band and clamp jaws extend outward from a back side of the clamp assembly.

The left hand grip 110 and right hand grip 108 are shown in an example of their fully compressed positions in FIG. 4. In FIG. 4, an edge of the left hand grip 110 may be seen to be in close proximity to an adjacent edge of the back cover 118, as indicated by a minimum separation distance 144 that is smaller than the maximum separation distance 136 in FIG. 3. As the left and right hand grips are compressed toward one another, the first and second clamp jaws (124, 126) are displaced laterally away from one another, reaching a maximum separation distance 142 when the hand grips are fully compressed. As the clamp jaws are displaced away from one another by compression of the hand grips, slack is simultaneously introduced into the flexible band 120. The flexible band 120 is shown in FIG. 4 in its fully extended position 146 for easy engagement or disengagement with a tray latch by slipping into a gap between the tray latch and the seat. The view toward the left side of the clamp assembly 100 in FIG. 6 shows an example of the flexible band 120 in its fully extended position 146. The positions of the flexible band 120 and clamp jaws (124, 126) may differ slightly from the examples of FIGS. 3-6 depending on the size and shape of the elongate support to which a clamp assembly 100 is being attached.

Figure 7:
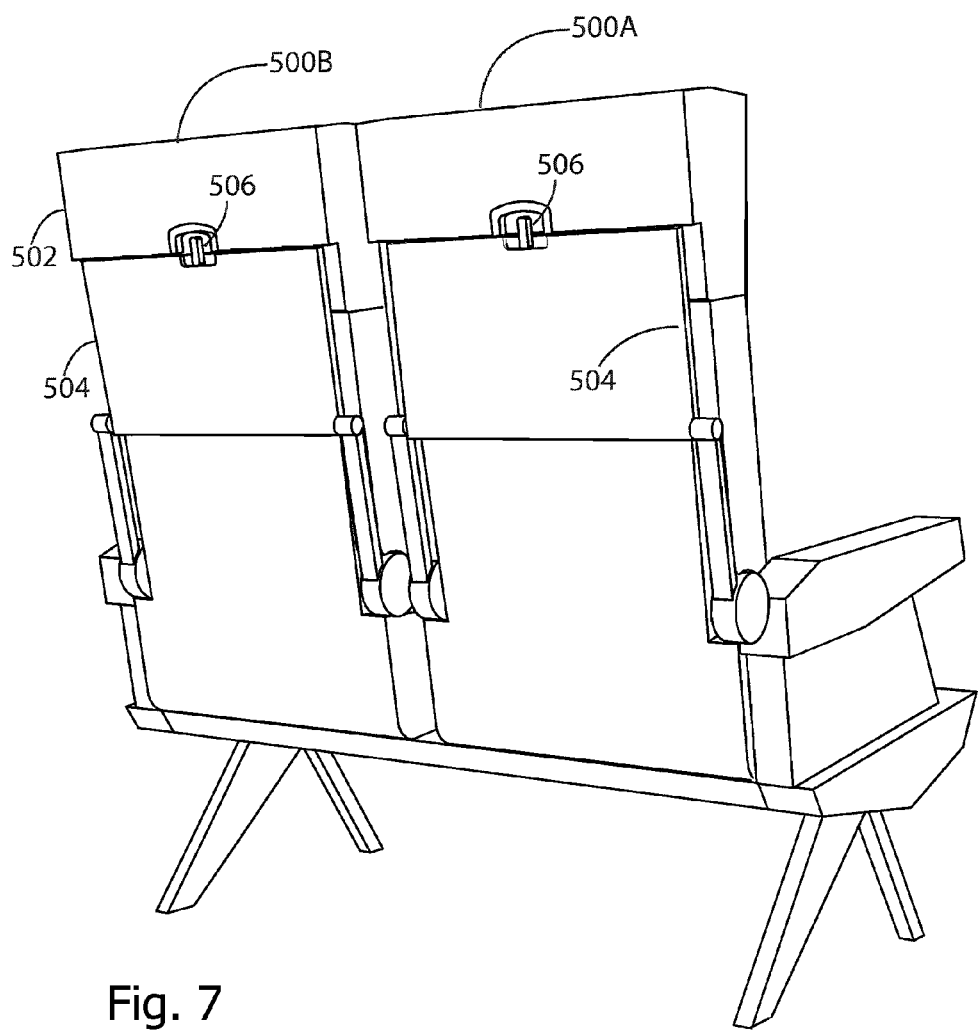
FIG. 7 shows a rear pictorial view of an example of reclinable seats having stowable seatback tray tables. (PRIOR ART)
Figure 8:
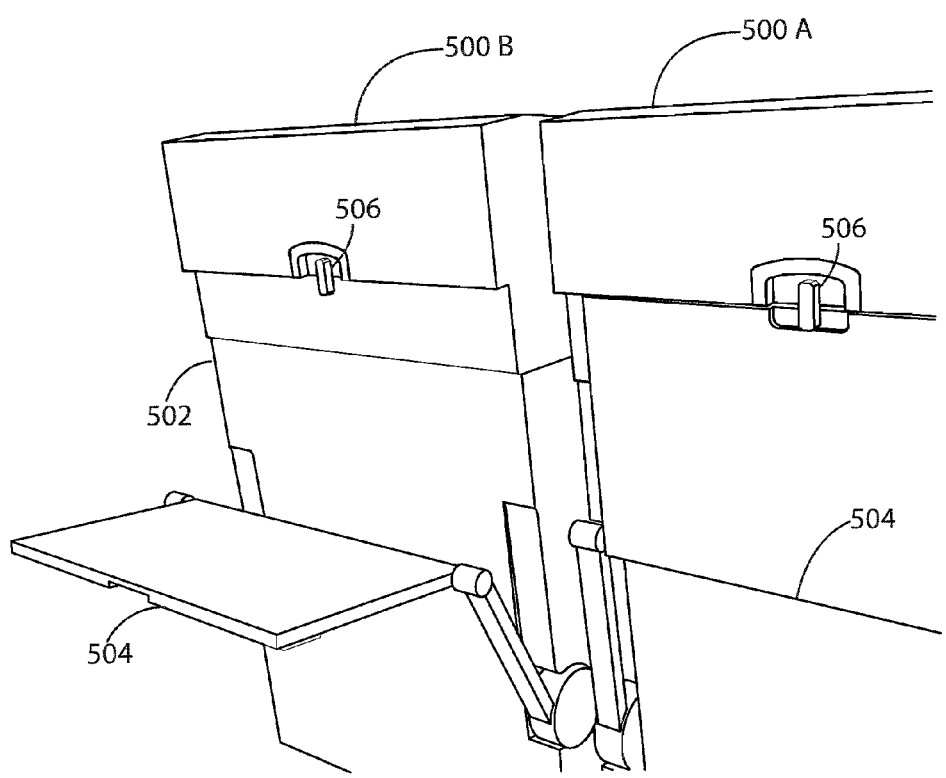
FIG. 8 shows the reclinable seats of FIG. 7, with a tray table on the right side of the figure in an example of a stowed position and another tray table on the left side of the figure in an example of an unstowed position. (PRIOR ART)
Figure 9:
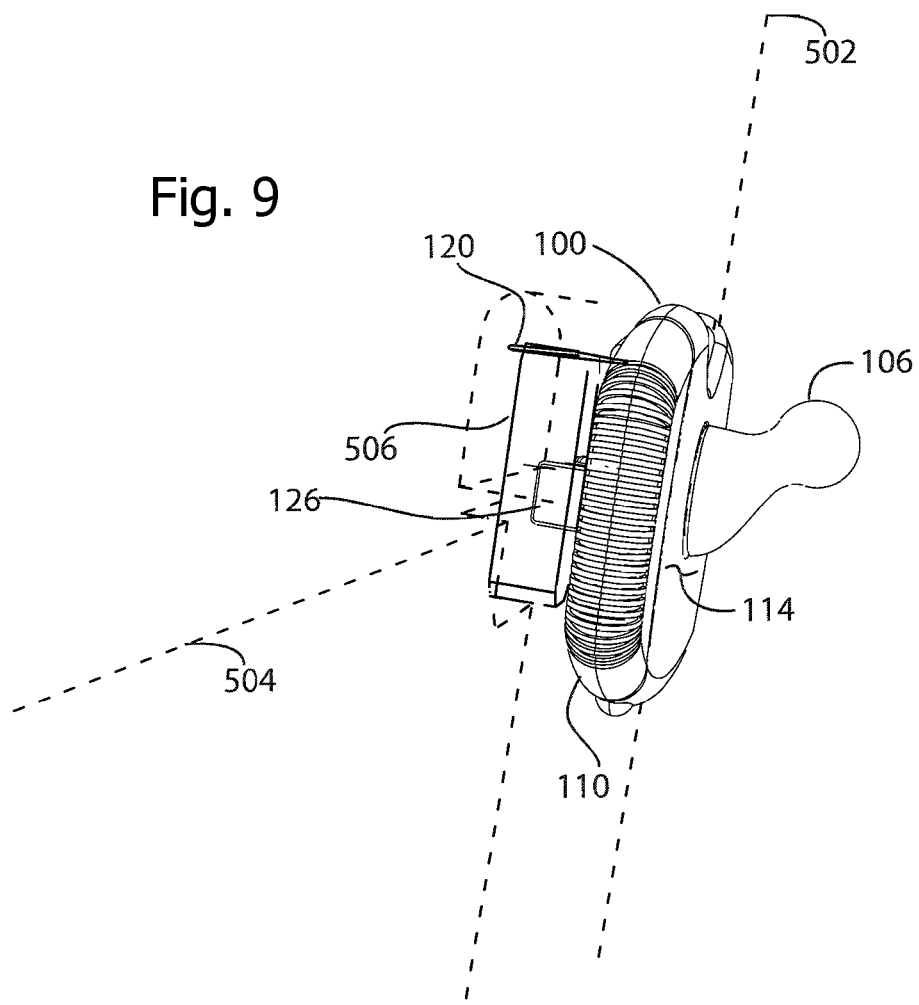
FIG. 9 shows a partial pictorial view of an example of a clamp assembly embodiment of the invention removably attached by the flexible band and clamp jaws to a tray latch on a seatback.

FIG. 7 illustrates a view toward the back side of an example of two reclinable passenger seats (500A, 500B). Each example of a passenger seat includes a seatback 502 against which a seatback tray table 504 is stowed, held in place by a tray latch 506. In the example of FIG. 7, the tray latches 506 are shown in a vertical orientation. In FIG. 8, the tray table 504 on the left side of the figure is shown in an unstowed position. The tray latch 506 for the unstowed tray has been returned to its vertical position after being rotated to a horizontal position to release the tray table 504. In FIG. 9, parts of the example of a passenger seat 500 and tray table 504 are shown with dashed lines. An example of a tray latch 506 is shown in solid outline to emphasize the position of the latch relative to the clamp assembly. The second clamp jaw 126 is shown in firm contact with a side of the tray latch 506. The first clamp jaw 124 in contact with the opposite side of the tray latch is not visible in the figure. The flexible band 120 is shown looped around the upper end of the tray latch 506, with the flexible band positioned between the tray latch and a back surface of the seatback 502. A pivot pin for the tray latch (not illustrated) may prevent the flexible band from falling off the latch before the flexible band is tightened, or the latch may be close enough to the seat back to securely hold the flexible band. Releasing the hand grips on the clamp assembly 100 causes the flexible band 120 to draw the clamp assembly tightly against the tray latch 506 and simultaneously forces the clamp jaws against the sides of the latch. Compressing the hand grips introduces slack into the flexible band and separates the clamp jaws, allowing the clamp assembly 100 to be removed from the tray latch 506.

Figure 10:
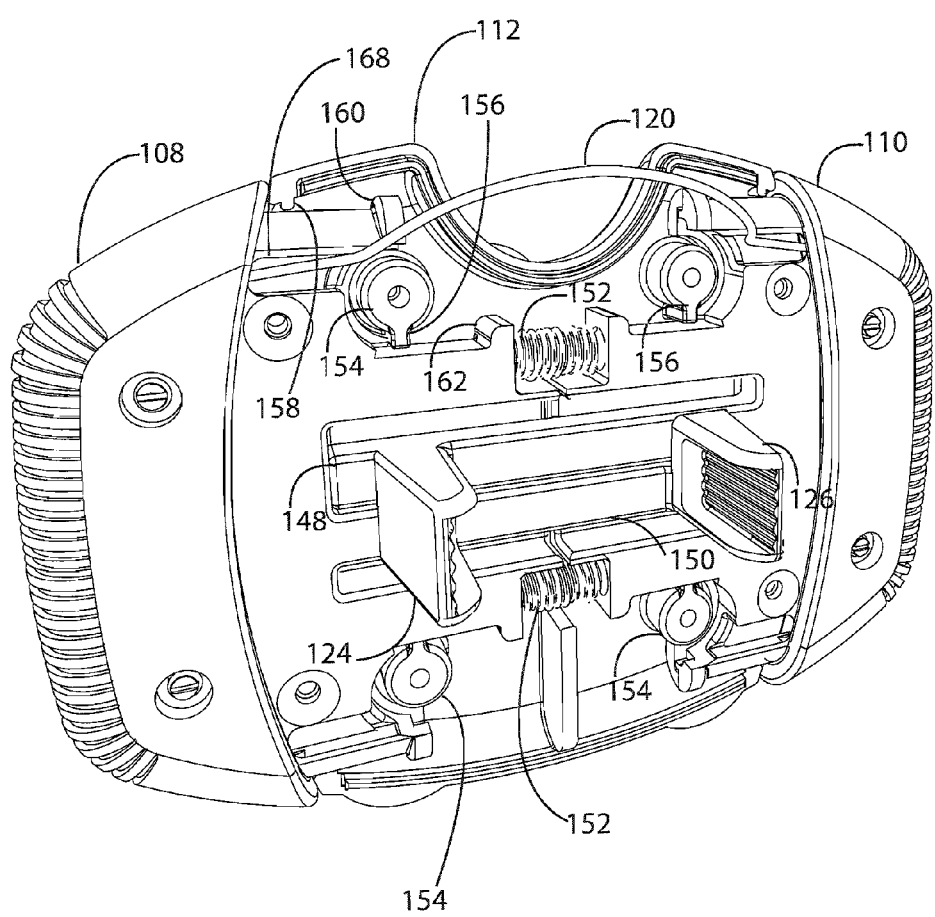
FIG. 10 shows a pictorial view of an example of a clamp assembly with the back cover removed and with the clamp jaws and hand grips positioned as described for FIG. 4.

FIGS. 10-19 illustrate more details of an example of a clamp assembly embodiment of the invention. FIG. 10 shows a clamp assembly with its back cover removed, viewing toward an interior surface of the front cover 112. In the example of FIG. 10, the right hand grip 108 and left hand grip 110 are shown in an example of their fully compressed positions as explained in regard to FIG. 4. Two helical springs 152 contact the right hand grip 108 and left hand grip 110. The examples of helical springs 152 are shown in their fully compressed state. The helical springs 152 are selected so that they provide a sufficient amount of force for securely holding the clamp assembly 100 to an external support by the first and second clamps, but the springs are preferably not so strong that they would cause difficulties for a person with weak gripping strength in their fingers from fully compressing the left and right hand grips. A clamp assembly for holding a relatively heavy portable electronic device may require stronger springs than a clamp assembly for holding a lighter portable electronic device.

Continuing with FIG. 10, four cover attachment bosses 154 provide support for the back cover (omitted in FIG. 10) and attachment points for the fasteners 122 shown in FIG. 2. Each cover attachment boss 154 also includes a rib 156 which engages a corresponding inner stop 162 on each hand grip (108, 110) to limit the distance by which the hand grips extend laterally outward from the clamp frame. A lip 158 on the front cover 112 and a corresponding lip on the back cover (not shown) are contacted by outer stops 160 on the hand grips to further limit the extension of the hand grips. The first clamp jaw 124 is attached to a support beam 148 that is part of the left hand grip 110. The second clamp jaw 126 is attached to another support beam 150 that is part of the right hand grip 108. The first clamp jaw 124 slides on the support beam 150 for the second clamp jaw 126, and the second clamp jaw 126 slides on the support beam 148 for the first clamp jaw 148. This arrangement of sliding clamp jaws and support beams attached to the left and right hand grips provides for smooth movement of the hand grips and clamp jaws even when a heavy portable electronic device is connected to the clamp assembly 100.

Figure 11:
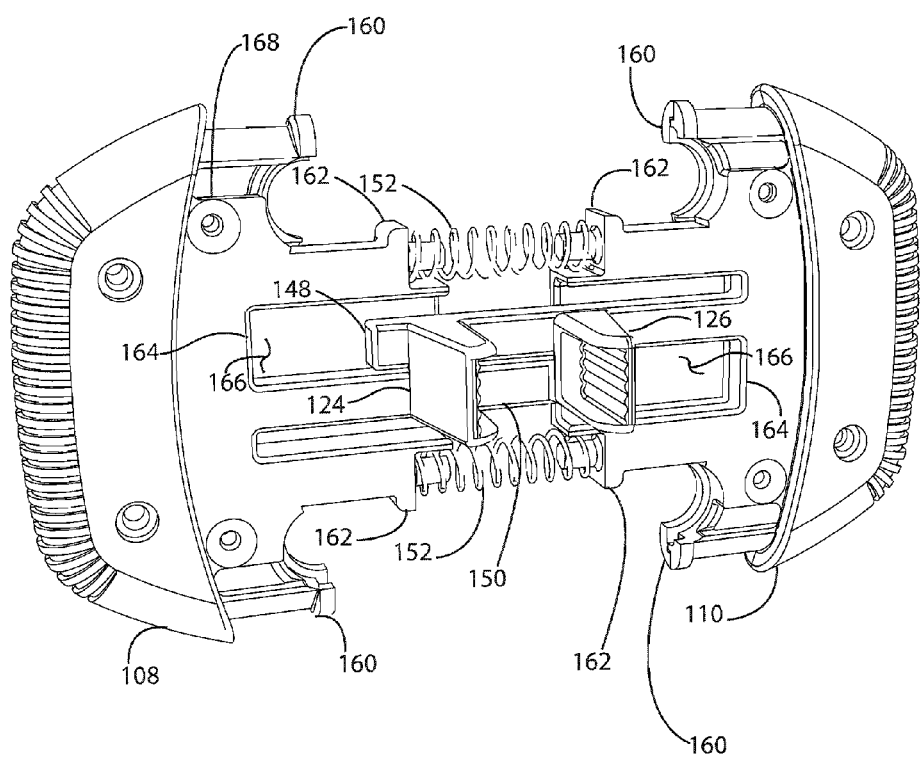
FIG. 11 shows a pictorial view toward the back side of examples of the left and right hand grips, with the clamp frame omitted to more clearly illustrate interaction between the hand grips.

FIG. 11 shows the left and right hand grips separated from the clamp frame. Each hand grip (108, 110) is formed with a channel 164 into which the opposing clamp jaw support beam slides when the hand grips are compressed toward one another. A flat bearing surface 166 on the bottom of each channel 164 provides a smooth surface for the ends of the support beams to slide across. An aperture 168 formed near a top side of each hand grip (108, 110) provides clearance for the flexible band (flexible band not shown in FIG. 11, see FIG. 10) when the hand grips are compressed toward one another, preventing binding of the hand grips against the flexible band.

Figure 12:
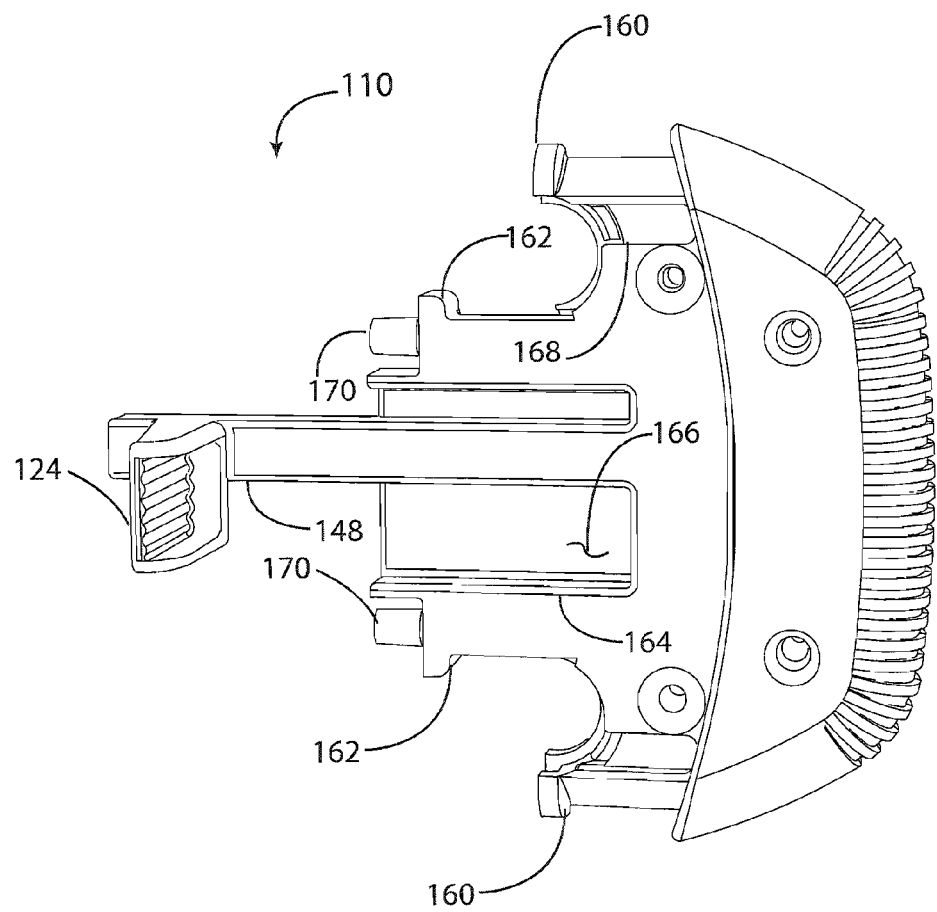
FIG. 12 shows a pictorial view toward the back side of an example of a left hand grip.
Figure 13:
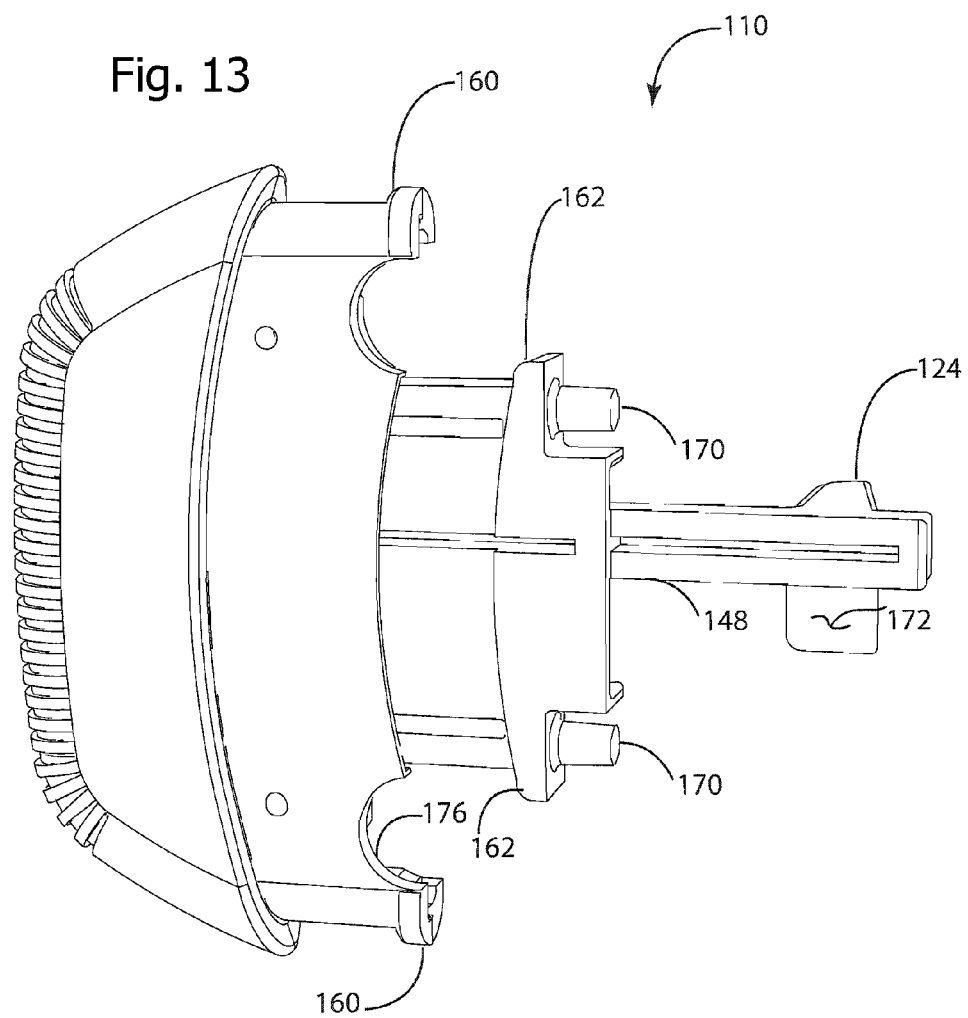
FIG. 13 shows a pictorial view the front side of the left hand grip of FIG. 12

An example of a left hand grip is shown in FIG. 12. The viewing direction in FIG. 12 is toward the back side of the hand grip. A pair of spring attachment posts 170 retain the helical springs 152 shown in FIGS. 10-11. FIG. 12 also shows the cantilevered attachment of the first clamp jaw 124 to its support beam 148. Part of the first clamp jaw 124 extending outward from the support beam 148 slides on the adjacent support beam for the second clamp jaw in the clamp assembly when the left and right hand grips are installed in the clamp frame. FIG. 12 also illustrates outer stops 160, inner stops 162, the clearance aperture 168 for the flexible band 120 (flexible band not shown in FIG. 12), and support beam bearing surface 166. FIG. 13 shows a view toward the front side of the hand grip of FIG. 12. A bearing surface 172 on the first clamp jaw 124 slides across and is supported by the support beam for the right hand grip (not illustrated in FIG. 13) when the left and right hand grips are installed in the clamp frame. The right hand grip 108 includes a similar bearing surface 172. Each hand grip may also include an arcuate face 176 which contacts the cover attachment bosses 154 when the hand grips are fully compressed, thereby protecting the smaller inner and outer stops (162, 160) from damage should a person squeezing the hand grips apply excessive force.

Figure 14:
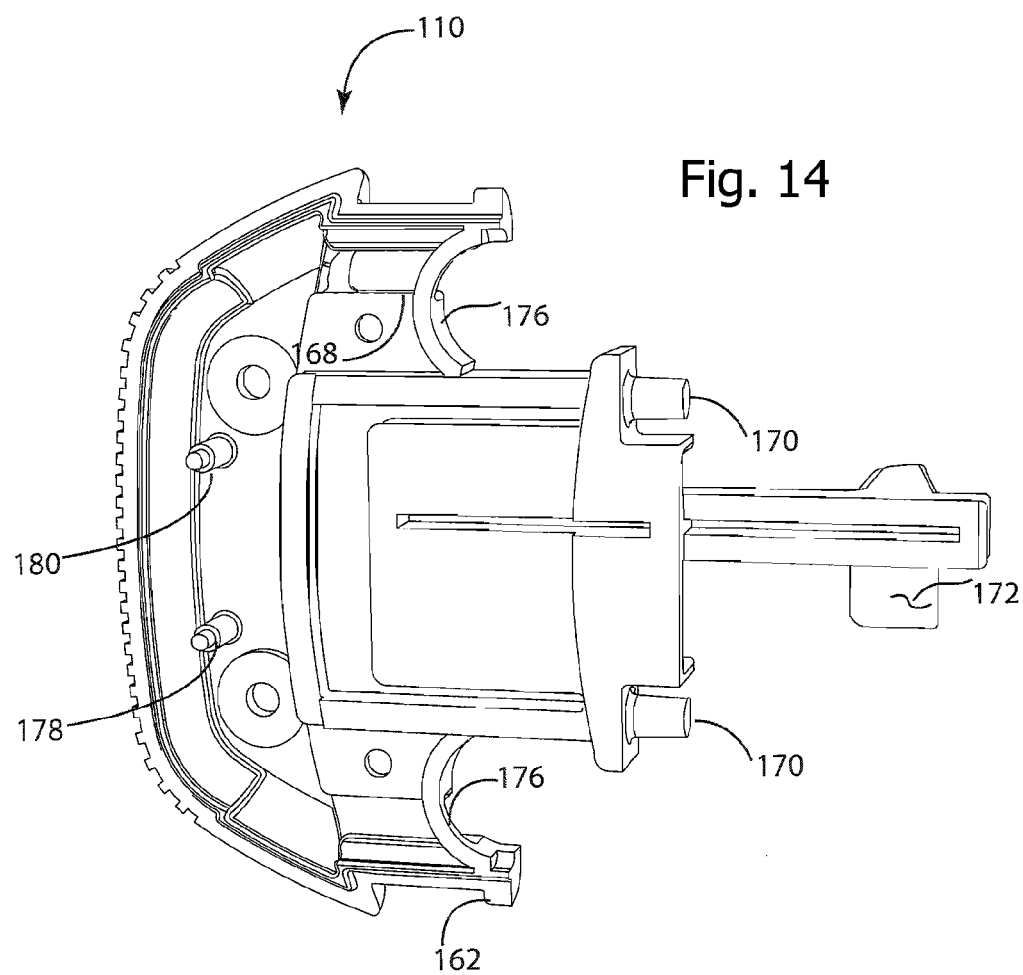
FIG. 14 shows a pictorial view toward the front side of the hand grip examples of FIGS. 12-13, with a hand grip cap removed.
Figure 15:
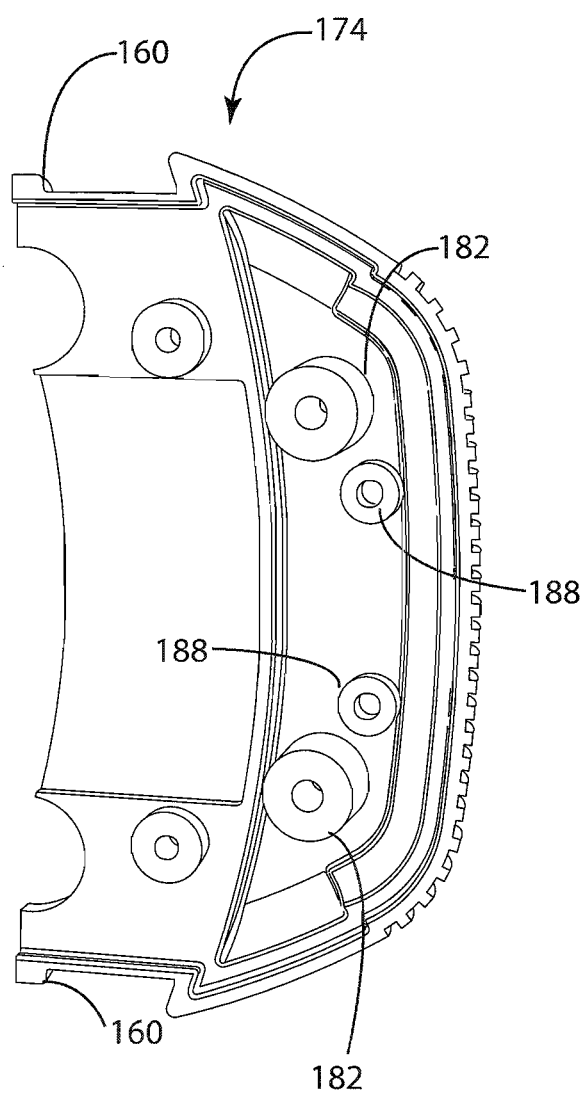
FIG. 15 shows a pictorial view toward the interior of an example of a hand grip cap.

The hand grip of FIG. 13 is shown with its hand grip cap removed in FIG. 14. An anchor post 178 for the flexible band 120 and a guide post 180 support the hand grip cap when it is attached to the hand grip and control the slack and tensioned positions of the flexible band within the hand grip during operation of the clamp assembly. Fastener attachment bosses 182 for joining a hand grip cap 174 to a hand grip (108, 110) are shown in FIG. 15.

A hand grip and its associated support beam and clamp jaw may be formed as an integral part as suggested in the examples of FIGS. 10-14. In alternative embodiments of the invention, a hand grip and its associated support beam and clamp jaw may be formed as separate parts that are joined together by adhesive, welding, or fasteners such as screws or rivets.

Figure 16:
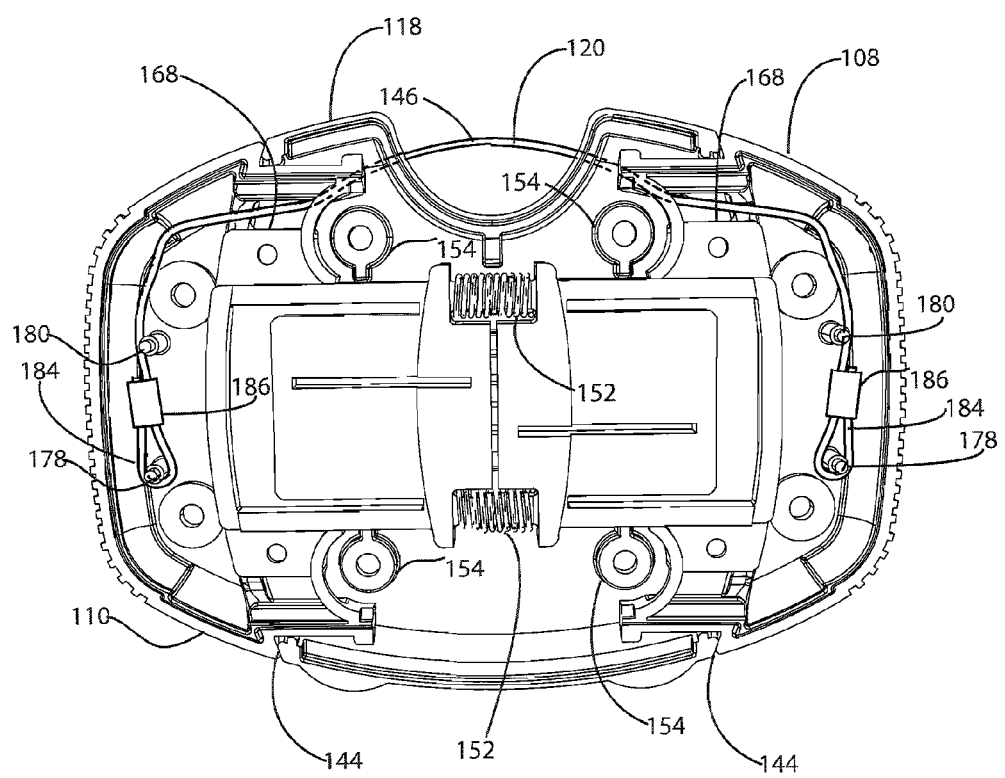
FIG. 16 shows the interior of the clamp assembly in a pictorial view toward the back cover with the front cover removed, hand grip caps removed from the hand grips, slack in the flexible band, and both springs compressed until stops on the hand grips contact stops on the cover.
Figure 17:
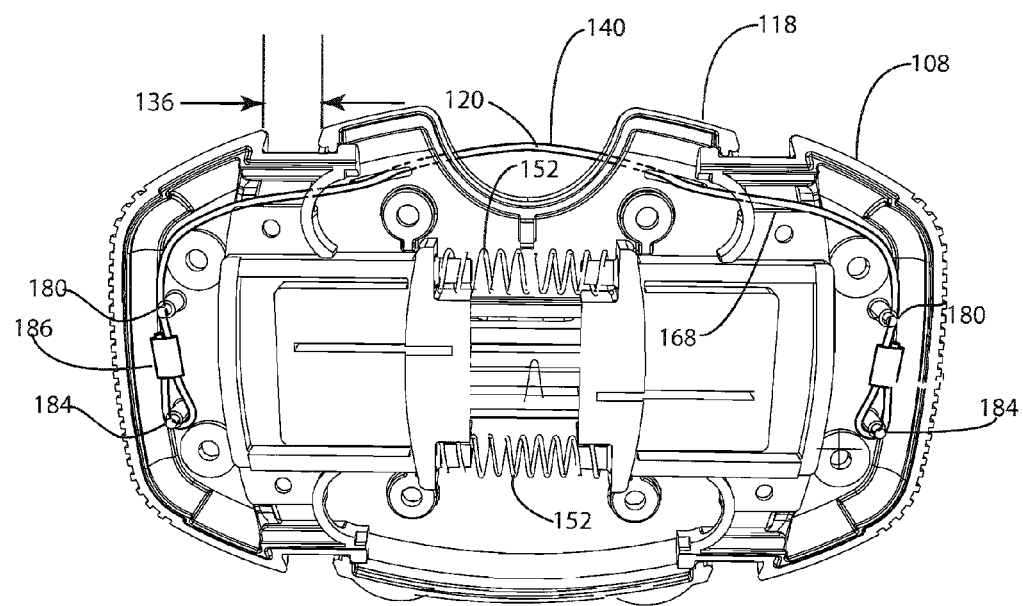
FIG. 17 shows the interior of the clamp assembly as in FIG. 16, but with the hand grips displaced away from one another by the springs until stops on the hand grips contact stops on the cover and slack is removed from the flexible band, shortening the length of flexible band exposed outside the clamp assembly.

FIGS. 16-17 show examples of a flexible band in its slackened and fully tensioned positions. FIG. 16 is a view toward the interior surface of the rear cover 118. The flexible band 120 has at each end a loop 184 held by a ferrule 186. Alternately, a ring lug may be attached to each end of the flexible band 120. The loop 184 at each end of the flexible band 120 is placed over an anchor post 178, one anchor post in the right hand grip 108 and another in the left hand grip 110. In FIG. 16, the left and right hand grips (110, 108) are in their fully compressed positions 144 and the flexible band 120 is slack. The slack may be removed by manually pulling the flexible band away from the clamp frame, thereby extending the flexible band to enable engagement with a tray latch or other elongate support. Alternately, the flexible band may be made from a material that is sufficiently stiff to cause the flexible band to force itself out of the slots in the elongate bosses on the back side of the clamp frame when the left and right handles are released, as shown in FIGS. 2 and 6.

In FIG. 17, the left and right hand grips (110, 108) are urged outward to their full extension 136 by the helical springs 152, thereby removing slack from the flexible band 120 as represented by its tightly retracted position 140. The flexible band 120 is prevented from folding into loops inside the left and right hand grips by guide posts 180 in each hand grip.

Figure 18:
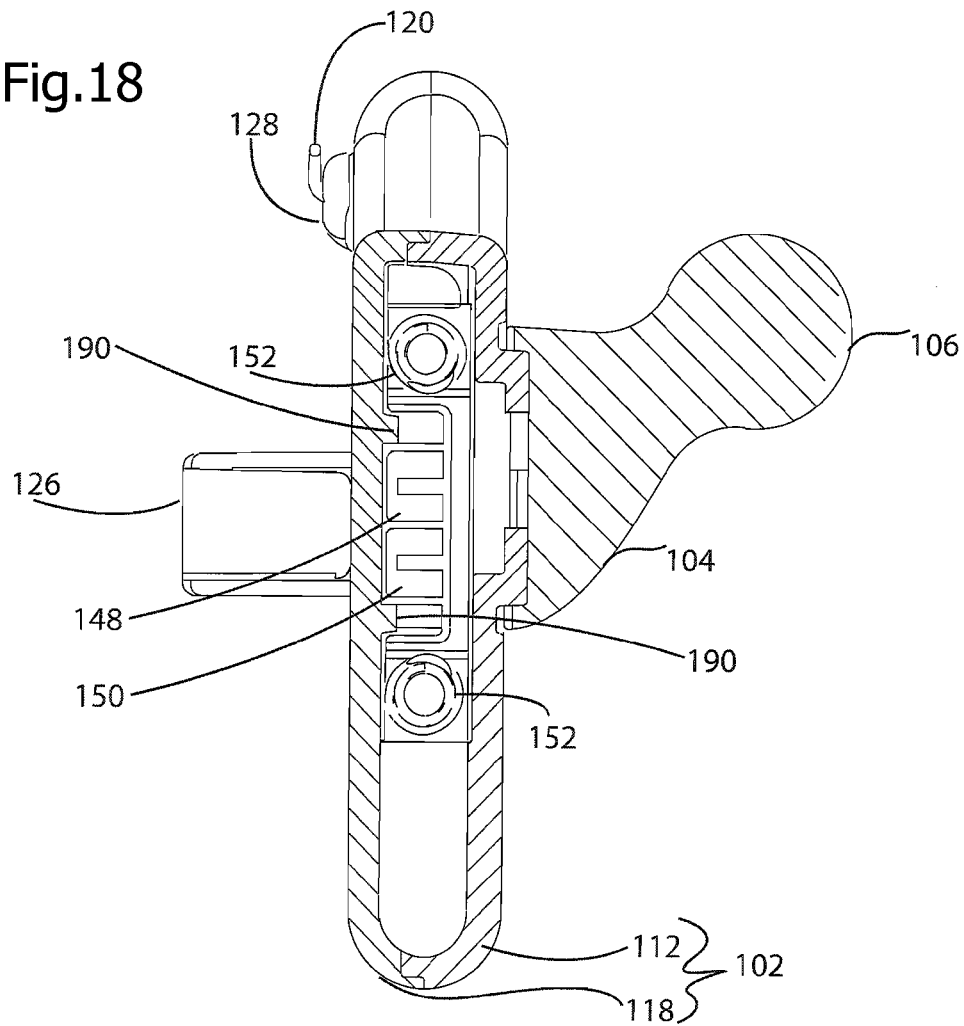
FIG. 18 is a cross-sectional view of the clamp assembly example of the previous figures. A location and viewing direction for the cross-section in FIG. 18 is shown by a line labeled A-A in FIG. 4.

FIG. 18 shows in a cross-section A-A a view of the second clamp jaw 126 on its support beam 150, the support beam 148 for the opposing first clamp jaw, and examples of the locations of two helical springs 152. A location and viewing direction for section A-A in FIG. 18 is marked by a line labeled A-A in FIG. 4. A pair of lateral ribs 190 may optionally be included on an interior surface of the back cover 118 for guiding the first and second support beams (148, 150) to provide a smooth sliding motion when the first and second hand grips are compressed or released. The lateral ribs 190 also resist twisting of the support beams (148, 150) and clamp jaw 126 when the clamp frame 102 is attached to a tray latch and subjected to a mechanical load such as the weight of a portable electronic device held by a device adapter connected to the ball joint 106. The adapter pivot arm 104 and ball joint 106 are shown in cross-section in FIG. 18, as is a portion of the flexible band 120 emerging from an elongate boss 128. The back cover 118 and front cover 112 comprise parts of the clamp frame 102, enclosing a space for holding the helical springs, support beams, and other parts, protecting moving parts from binding caused by dirt and foreign objects, and protecting a user's fingers from being pinched in the mechanism.

Figure 19:
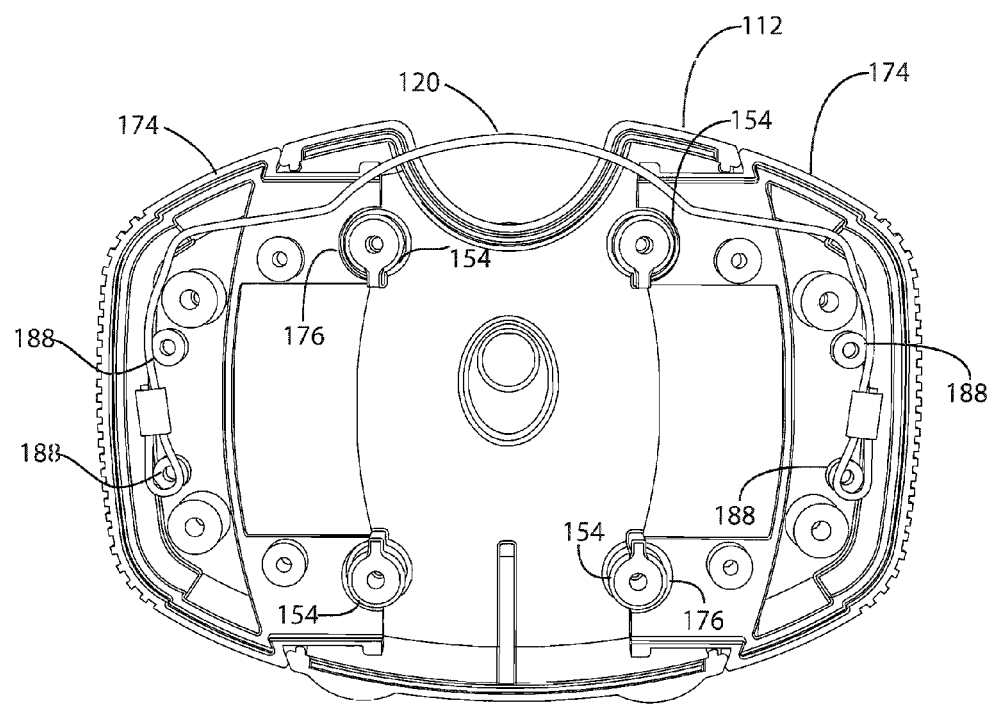
FIG. 19 is a pictorial view toward the interior of the front cover, showing an example of a slack flexible band and further showing the position of the hand grip caps when both hand grips are in their fully compressed position.

FIG. 19 shows a view toward an interior surface of the front cover 112, including examples of positions for cover attachment bosses 154 and bosses 188 for receiving ends of the anchor posts 178 and guide posts 180. Hand grip caps 174 are shown in their fully compressed positions with an arcuate face 176 on each cap, corresponding to the arcuate faces on the hand grip shown in FIG. 13, in contact with the attachment bosses 154 to prevent the hand grips from being compressed any further toward one another.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations. Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
    a clamp frame;
    a first hand grip slidably coupled to said clamp frame, said first hand grip comprising a first clamp jaw;
    a second hand grip slidably coupled to said clamp frame, said second hand grip comprising a second clamp jaw;
    a flexible band having a first end attached to said first hand grip and a second end attached to said second hand grip; and
    a spring connected to said first hand grip and to said second hand grip and disposed between said first and second hand grips, thereby urging said first hand grip away from said second hand grip, removing slack from said flexible band, and urging said first clamp jaw toward said second clamp jaw, wherein a displacement of said first and second hand grips toward one another forces said flexible band to extend outward from said clamp frame.

2. The apparatus of claim 1, wherein said displacement of said first and second hand grips toward one another forces said first and second clamp jaws to displace laterally away from one another.

3. The apparatus of claim 1, wherein a displacement of said first and second hand grips away from one another by said spring partially retracts said flexible band into said clamp frame.

4. The apparatus of claim 1, further comprising:
    a first support beam extending laterally from said first hand grip toward said second hand grip; and
    a second support beam extending laterally from said second hand grip toward said first hand grip,
    wherein said first hand grip is formed with a channel into which said second support beam slides, said second hand grip is formed with a channel into which said first support beam slides, said first clamp jaw is attached to said first support beam, and said second clamp jaw is attached to said second support beam.

5. The apparatus of claim 4, wherein said first clamp jaw is in sliding contact with said second support beam.

6. The apparatus of claim 4, wherein said second clamp jaw is in sliding contact with said first support beam.

7. The apparatus of claim 4, wherein said first and second support beams are positioned between a front cover and a back cover of said clamp frame.

8. The apparatus of claim 1, comprising two of said spring disposed between said first hand grip and said second hand grip, wherein both of said spring are compressed when said first and second hand grips are displaced toward one another and both of said spring urge said first and second hand grips toward one another.

9. The apparatus of claim 1, wherein said clamp frame further comprises:
   a front cover;
   a back cover formed with a slot through which said flexible band extends and an aperture through which said first clamp jaw extends; and
   an adapter pivot arm attached to said front cover.

10. The apparatus of claim 1, wherein each of said first and second hand grips include at least one stop for limiting lateral displacement of said first and second clamp jaws when said at least one stop contacts said clamp frame.

11. The apparatus of claim 1, wherein each of said first and second hand grip comprise a guide post and an anchor post and said flexible band removably attaches to said anchor post in said first hand grip and to said anchor post in said second hand grip.

12. The apparatus of claim 1, wherein each of said first and second hand grip further comprise a hand grip cap and a nonslip grip.

13. The apparatus of claim 12, wherein said flexible band is detachable from said clamp frame by removing said hand grip cap from each of said first and second hand grips.

14. The apparatus of claim 1, wherein said clamp frame is formed with an arcuate channel on a top side of said clamp frame through which a segment of said flexible band is visible.

* * * * *